Patented Aug. 18, 1953

2,649,434

UNITED STATES PATENT OFFICE 2,649,434

POLYMERIZATION OF ACRYLONITRILE IN THE PRESENCE OF PREFORMED POLYMERS

Harry W. Coover, Jr., Kingsport, Tenn., and Joseph B. Dickey, Rochester, N. Y., assignors to Eastman Kodak Company, Rochester, N. Y., a corporation of New Jersey No Drawing. Application May 27, 1950, Serial No. 164,854

18 Claims. (Cl. 260—45.5)

This invention relates to the polymerization of acrylonitrile in the presence of preformed polymers, and to articles obtained therefrom.

It has been previously proposed to polymerize acrylonitrile in the presence of polyvinyl resins, such as polyvinyl acetate (U. S. Patent 2,123,599, dated July 12, 1938). The polymers obtained according to the suggested method in U. S. Patent 2,123,599 can be used to prepare synthetic fibers, which are susceptible to many of the known organic dyes. A serious drawback with this method is that the fibers thus obtained have too low a softening temperature to be of commercial value, softening being observed at temperatures as low as 145° C.

Attempts have been made to increase the dyeability of polyacrylonitrile fibers by interpolymerizing acrylonitrile with certain monomers whose polymers have an affinity for dyes. While this procedure does give polymer products, from which fibers having good dyeing properties can be obtained, a serious drawback, such as that mentioned above, arises in certain instances, a substantial lowering of the softening point of the fiber being observed. For example, while an interpolymer of acrylonitrile and vinyl acetate containing about 80 per cent by weight of acrylonitrile can be drawn into fibers susceptible to dyeing, the softening point of such fibers is too low for practical purposes, softening of the fibers being observed at about 150°–170° C.

Other attempts have been made to increase the dyeability of polyacrylonitrile fibers by mixing with the polyacrylonitrile, before spinning, other polymeric materials which are dye-susceptible. This procedure likewise provides fibers having good dyeing properties, however, many of these fibers show a low softening point, and in addition many show segmentation into their individual components along their horizontal axis. For example, it can be demonstrated that mixtures of polyvinyl acetate and polyacrylonitrile, when dissolved in either N,N-dimethylformamide or N,N-dimethylacetamide in proportions varying from 15 to 50 per cent by weight of polyvinyl acetate based on the total weight of the mixed polyacrylonitrile and polyvinyl acetate, form grainy dopes which separate into two liquid layers on standing. This is also true of many other polymeric compounds, natural or synthetic, which are soluble in the above solvents. Fibers which form from these non-homogenous solutions or mixtures of polyacrylonitrile and polyvinyl acetate are too low in softening temperature to be of practical value, and also are subject to the defect of segmentation. This is not surprising because of the non-homogeneous condition of the spinning solution and the fact that it is generally known that polyacrylontrile is not compatible with many organic substances.

We have now made the unusual and valuable discovery that stable solutions of acrylonitrile polymers which do not separate into distinct layers on standing, and from which fibers of homogeneous character can be spun, can be prepared by polymerizing acrylonitrile in the presence of preformed polymers which have not been separated from their polymerization medium prior to the addition of monomeric acrylonitrile. These fibers are characterized by a softening point higher than the interpolymers referred to above, and do not exhibit the segmentation defect shown by many of the fibers prepared from certain prior art materials comprising polyacrylonitrile.

It is, therefore, an object of our invention to provide acrylonitrile polymer compositions. A further object of our invention is to provide methods for making these modified polymer compositions. Still another object is to provide homogenous solutions obtained from these polymer compositions comprising acrylonitrile. Another object is to provide fibers from these homogenous solutions, and methods for making these fibers. Other objects will become apparent from a consideration of the following description and examples.

According to our invention, we provide polymer compositions comprising acrylonitrile by polymerizing acrylonitrile in the presence of a preformed polymer which has not been separated from its polymerization medium prior to the addition of the acrylonitrile. When the preformed polymer is separated from its polymerization medium, and redissolved in a solvent, or suspended in an aqueous medium, all of the reactive groups in the polymer chain are apparently closed, or rendered inactive, and polymerization of the acrylonitrile with this separated polymer causes a substantial lowering of softening point in certain instances, such as with polyvinyl acetate.

When the acrylonitrile is added to the preformed polymer before separation of the polymer from the reaction medium, a certain number of groups in the polymer chain apparently remain reactive, and the acrylonitrile is able to increase the length of the polymer chain. The compositions obtained according to our invention are not to be confused with simple interpolymers which have a low softening point as has been noted above.

The polymer compositions of our invention contain from 5 to 95 per cent by weight of acrylonitrile, based on the combined weights of the other monomer, from which the preformed polymer is obtained, and acrylonitrile. Those compositions containing from about 60 to 90 per cent by weight of acrylonitrile have been found to be especially useful as fiber-forming materials. Those compositions containing from about 5 to 60 per cent by weight of acrylonitrile have been found to be especially useful in the preparation of compositions with polyacrylonitrile, which have been found to be substantially homogeneous in character. The compositions containing from 5 to 60 per cent by weight of acrylonitrile can be added directly to polyacrylonitrile (i. e. homopolymeric acrylonitrile), or the compositions can be left in their reaction medium after the polymerization is substantially complete, and sufficient acrylonitrile can be added to produce a final product containing from 60 to 90 per cent by weight of acrylonitrile (which composition is useful in the preparation of fibers of high softening point and ready susceptibility to dyeing), and the acrylonitrile polymerized in the presence of this "active" polymer.

The preformed polymers which are useful in practicing our invention can be prepared by polymerizing monomers containing ethenoid unsaturation according to methods well known to the art. As ethenoid compounds we have found that acrylamides, acrylic esters, citraconamides, itaconamides, and vinyl esters provide compositions showing especially useful properties. The acrylamides have been found to be especially advantageous when used according to our invention.

The acrylamides which can be advantageously used in our invention comprise those represented by the following general formula:

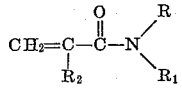

wherein R and $R_1$ each represents a hydrogen atom or alkyl group, such as methyl, ethyl, n-propyl, isopropyl, n-butyl, isobutyl, etc. groups (e. g. an alkyl group of the formula $C_nH_{2n+1}$ wherein $n$ represents a positive integer of from 1 to 4), and $R_2$ represents a hydrogen atom or a methyl group. Typical acrylamides include acrylamide, N-methylacrylamide, N-ethylacrylamide, N-isopropylacrylamide, N-n-butylacrylamide, methacrylamide, N-methylmethacryamide, N-ethylmethacrylamide, N-isopropylmethacrylamide, N,N-dimethylacrylamide, N,N-diethylacrylamide, N,N-dimethylmethacrylamide, etc.

As acrylic esters, we can advantageously use those represented by the following general formula:

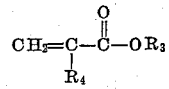

wherein $R_3$ represents an alkyl group, such as methyl, ethyl, n-propyl, isopropyl, n-butyl, isobutyl, etc. groups (e. g. an alkyl group of the formula $C_nH_{n+1}$ wherein $n$ represents a positive integer from 1 to 4), and $R_4$ represents a hydrogen atom, a methyl group, an acylamino group wherein the acyl group is the acyl group of a saturated aliphatic carboxylic acid containing from 2 to 4 carbon atoms, such as acetyl, propionyl, butyryl, isobutyryl, etc. groups, or a carbalkoxylamino group wherein the alkoxyl group contains from 1 to 4 carbon atoms such as methyl, ethyl, n-propyl, isopropyl, n-butyl, isobutyl, etc. groups. Typical esters wherein $R_4$ represents a hydrogen atom or a methyl group include methyl acrylate, ethyl acrylate, n-butyl acrylate, isobutyl acrylate, methyl methacrylate, ethyl methacrylate, n-propyl methacrylate, isopropyl methacrylate, n-butyl methacrylate, isobutyl methacrylate, etc. Typical esters wherein $R_4$ represents an acylamino group include, for example, methyl α-acetaminoacrylate, ethyl α-acetaminoacrylate, n-propyl α-acetaminoacrylate, isopropyl α-acetaminoacrylate, n-butyl α-acetaminoacrylate, methyl α-propionaminoacrylate, ethyl α-propionaminoacrylate, n-butyl α-propionaminoacrylate, methyl α-n-butyraminoacrylate, ethyl α-n-butyraminoacrylate, isobutyl α-n-butyraminoacrylate, methyl α-isobutyraminoacrylate, ethyl α-isobutyraminoacrylate, n-propyl α-isobutyraminoacrylate, isobutyl α-isobutyraminoacrylate, etc. The acrylic esters wherein $R_4$ represents an acylamino group can be prepared according to the general method described in the copending application Serial No. 87,356, filed April 13, 1949, of H. W. Coover, Jr. and Joseph B. Dickey, now U. S. Patent 2,548,518, issued April 10, 1951. The process described in that application comprises reacting an alkali metal salt of an α-acylaminoacrylic acid with a dialkyl sulfate. The alkali metals useful for this process comprise those set forth in Serial No. 87,356 and also the alkali metal salts of the α-acylaminoacrylic acids described in the copending application Serial No. 132,216, filed December 9, 1949, of H. W. Coover, Jr. and Joseph B. Dickey, now U. S. Patent 2,622,074, issued December 16, 1952.

The acrylic esters wherein $R_4$ represents a carbalkoxylamino group can be prepared according to the method described in application Serial No. 132,217, filed December 9, 1949, now U. S. Patent 2,563,776, issued August 7, 1951. Typical esters wherein $R_4$ represents a carbalkoxylamino group include methyl α-carbomethoxyaminoacrylate, ethyl α-carbomethoxyaminoacrylate, isobutyl α-carbomethoxyaminoacrylate, methyl α-carbethoxyaminoacrylate, n-propyl α-carbethoxyaminoacrylate, isobutyl α-carbethoxyaminoacrylate, methyl α-carbopropoxyaminoacrylate, ethyl α-carbopropoxyaminoacrylate, isopropyl α-carbopropoxyaminoacrylate, n-butyl α-carbopropoxyaminoacrylate, methyl α-carbisopropoxyaminoacrylate, isobutyl α-carbisopropoxyaminoacrylate, methyl α-carbobutoxyaminoacrylate, n-propyl α-carbobutoxyaminoacrylate, methyl α-carbisobutoxyaminoacrylate, ethyl α-carbisobutoxyaminoacrylate, n-butyl α-carbisobutoxyaminoacrylate, etc.

As itaconamides, we can advantageously use those represented by the following general formula:

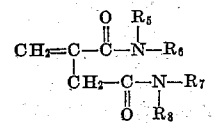

wherein $R_5$, $R_6$, $R_7$, and $R_8$ each represents a hydrogen atom, a methyl group, an ethyl group, etc. Typical itaconamides include itaconamide, N-methyl itaconamide, N-ethyl itaconamide, N,N'-dimethyl itaconamide, N,N'-dimethyl itaconamide, etc.

As citraconamides, we can advantageously use those represented by the following general formula:

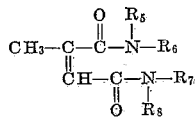

wherein $R_5$, $R_6$, $R_7$, and $R_8$ have the values given above. Typical citraconamides include citraconamide, N-methyl citraconamide, N-ethyl citraconamide, N,N'-dimethyl citraconamide, N,N'-diethyl citraconamide, etc.

As vinyl esters, we can advantageously employ those represented by the following general formula:

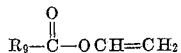

wherein $R_9$ represents a hydrogen atom or an alkyl group, such as methyl, ethyl, n-propyl, isopropyl, etc. groups (e. g. an alkyl group containing from 1 to 3 carbon atoms).

In preparing the polymer compositions of our invention, a monomer selected from those represented by the above general formulas is polymerized until homopolymerization is substantially complete, i. e. further heating produces no additional polymerization, and the acrylonitrile monomer is then added and the polymerization is continued until no further polymerization can be detected. The polymerization is advantageously carried out in an aqueous medium, although other reaction media, such as organic solvents, can be employed, for example, a polymerization medium consisting of aqueous acetone, or other aqueous solvent can be used.

The polymerization can be accelerated by the use of a well-known polymerization catalyst. Such catalysts are commonly used in the art of polymerization, and our invention is not to be limited to any particular catalyst material. Catalysts which have been found to be especially useful comprise the peroxide polymerization catalysts, such as the organic peroxides (e. g. benzoyl peroxide, acetyl peroxide, acetyl benzoyl peroxide, lauryl peroxide, oleoyl peroxide, triacetone peroxide, urea peroxide, t-butyl hydroperoxide, alkyl percarbonates, etc.), hydrogen peroxide, perborates (e. g. alkali metal perborates, such as those of sodium and potassium, etc.), persulfates (e. g. alkali metal ammonium persulfate, etc. Other catalysts such as the ketazines, azines, etc. can be used. The quantity of catalyst used can be varied, depending on the monomer, amount of diluent, etc. Sufficient catalyst can be used to homopolymerize the ethenoid monomer selected from those represented by the above general formulas and the monomeric acrylonitrile, or an amount of catalyst sufficient to polymerize only the ethenoid monomer can be used, and additional catalyst can be added with the acrylonitrile monomer to complete the polymerization. The catalyst added along with acrylonitrile may be the same catalyst that was used to polymerize the other ethenoid monomer. We have found that it is especially advantageous to use an amount of catalyst sufficient to polymerize only the first monomer, and then upon addition of the acrylonitrile to add a further amount of catalyst at that time. This procedure provides a readier means for regulating the molecular weight distribution of the polymer composition.

The temperatures at which the process of our invention can be carried out vary from ordinary room temperature to the reflux temperature of the reaction mixture. Generally, a temperature of from 25° to 75° C. is sufficient.

If desired, emulsifying agents can be added to the reaction mixture to distribute uniformly the reactants throughout the reaction medium. Typical emulsifying agents include the alkali metal salts of certain alkyl acid sulfates (e. g. sodium lauryl sulfate), alkali metal salts of aromatic sulfonic acids (sodium isobutylnaphthalenesulfonate), alkali metal or amine addition salts of sulfosuccinic acid esters, alkali metal salts of fatty acids containing from 12 to 20 carbon atoms, sulfonated fatty acid amides, alkali metal salts of alkane sulfonic acids, sulfonated ethers (e. g. aryloxy polyalkylene ether sulfonates, such as Triton 720), etc.

The polymerization can be carried out in the presence of chain regulators, such as hexyl, octyl, lauryl, dodecyl, myristyl mercaptans, etc., which impart improved solubility properties to the polymer compositions. If desired, reducing agents such as alkali metal bisulfites (e. g. potassium, sodium, etc. bisulfites) can be added to reduce the time required for the polymerization to be effected.

The following examples will serve to illustrate further the manner whereby we practice our invention.

*Example 1*

9.7 g. of vinyl acetate were suspended in 100 cc. of distilled water along with 0.1 g. of ammonium persulfate, 0.1 g. of sodium bisulfite, and 1.0 g. of a aryloxy polyalkylene sulfonated ether (Triton 720). The resulting emulsion was allowed to polymerize for 16 hours at 50° C. and then cooled down to room temperature. A solution of 0.5 g. of acrylonitrile, 0.01 g. of ammonium persulfate, and 0.01 g. of sodium bisulfite in 10 cc. of water was added and the polymerization completed by tumbling at 50° C. for 8 hours. The emulsion was broken by the addition of a concentrated salt solution, and the precipitated polymer was filtered, washed, and dried. On analysis, the polymer composition was found to contain 95 per cent by weight of vinyl acetate.

Fibers obtained from a mechanical mixture containing 30 per cent by weight of the polymer obtained and 70 per cent by weight of polyacrylonitrile, by extruding a solution of the mixture in N,N'-dimethylformamide into a precipitating bath, had a tenacity of 3.4 g. per denier, an extensibility of 20 per cent, a sticking temperature of 195° C., and shrank 9 per cent in boiling water.

*Example 2*

2.0 g. of N-methylmethacrylamide were dissolved in 80 cc. of water along with 0.02 g. of potassium persulfate and 0.02 g. of sodium bisulfite. The solution was allowed to polymerize for sixteen hours at 25° C. There were then added 8.0 g. of acrylonitrile, 0.1 g. of potassium persulfate and 0.1 g. of sodium bisulfite, and the mixture was allowed to polymerize for eight hours at 25° C. The polymer product was then separated from the reaction mixture by filtration, yielding 9.2 g. On analysis the polymer was found to contain 21 per cent by weight of N-methylmethacrylamide.

Example 3

2.0 g. of vinyl acetate were suspended in 18 cc. of water along with 0.02 g. of ammonium persulfate, 0.02 g. of sodium bisulfite, and 1.1 g. of an aryloxy polyalkylene sulfonated ether (Triton 720). The resulting emulsion was allowed to polymerize for sixteen hours at 50° C., then cooled to room temperature, and a dispersion containing 8.0 g. of acrylonitrile, 0.1 g. of ammonium persulfate, 0.1 g. of potassium bisulfite and 2.0 g. of an aryloxy polyalkylene sulfonated ether (Triton 720) in 50 cc. of water was added. After tumbling the resulting emulsion at 50° C. for two hours, the polymer product was precipitated by the addition of a sodium chloride solution to give 9.7 g. of product containing 20 per cent by weight of vinyl acetate.

Example 4

2.0 g. of N-methylacrylamide were dissolved in 100 cc. of water containing 0.04 g. of potassium persulfate. The solution was heated at 50° C. for sixteen hours, and the solution cooled to room temperature. There were then added 8.0 g. of acrylonitrile, 0.1 g. of potassium persulfate and 0.1 g. of sodium bisulfite. The reaction mixture was then allowed to stand at 25° C. for sixteen hours. The precipitated polymer weighed 8.5 g. and contained 20 per cent by weight of N-methylacrylamide.

Fibers were then spun by extruding a solution of the polymer in N,N-dimethylformamide into a precipitating bath. The fibers thus obtained had a tenacity of 3.3 g. per denier, an extensibility of 17 per cent, a sticking temperature of 200° C., and shrank only 10 per cent in boiling water. The fibers remained soft after being subjected to the usual dye-baths.

Contrasted with the fibers obtained above, fibers obtained from an interpolymer containing 77 per cent by weight of acrylonitrile and 23 per cent by weight of N-methylacrylamide had a tenacity of 2.5 g. per denier, an extensibility of 10 per cent, a sticking temperature of 130° C., and shrank 25 per cent when held for 30 seconds in a relaxed state in boiling water. Fibers obtained from a mechanical mixture containing 20 per cent by weight of poly-N-methylacrylamide and 80 per cent by weight of polyacrylonitrile had a tenacity of 2.6 g. per denier, an extensibility of 13 per cent, a sticking temperature of 180° C., and shrank only 10 per cent in boiling water. The fibers obtained from the mechanical mixture stiffened when dyed by normal methods used for dyeing fabrics or fibers.

Example 5

2.0 g. of vinyl acetate were suspended in 18 cc. of water along with 0.02 g. of ammonium persulfate, 0.02 g. of sodium bisulfite, and 1.1 g. of an aryloxy polyalkylene sulfonated ether (Triton 720). The resulting emulsion was allowed to polymerize for sixteen hours at 50° C., then cooled down to room temperature and added to a dispersion containing 8.0 g. of acrylonitrile, 1.0 g. of ammonium persulfate, 0.1 g. of sodium bisulfite, and 2.0 g. of an aryloxy polyalkylene sulfonated ether (Triton 720) in 50 cc. of water. After tumbling the reaction mixture at 50° C. for two hours, the polymer product was precipitated by the addition of an aqueous solution of sodium chloride to give 9.7 g. of polymer product containing 20 per cent by weight of vinyl acetate.

Fibers were then spun from the product obtained above by extruding a solution of the polymer in N,N-dimethylformamide into a precipitating bath. The fibers thus obtained had a tenacity of 3.5 g. per denier, an extensibility of 21 per cent, a sticking temperature of 220° C., and shrank 8 per cent in boiling water.

2.0 g. of polyvinyl acetate were dissolved in 20 cc. of benzene, and a dispersion of 0.1 g. of ammonium persulfate, 0.2 g. of potassium bisulfite, 1 cc. of 7-ethyl-2-methylundecan-4-sulfonic acid sodium salt (Tergitol No. 4), and 8.0 g. of acrylonitrile in 60 cc. of water was added. The resulting emulsion was tumbled for sixteen hours at 25° C., and the polymer product was isolated by coagulation with an aqueous salt solution. The yield of product was 9.2 g. containing 20 per cent by weight of vinyl acetate.

Fibers obtained from the product weighing 9.2 g. were prepared by extruding a solution of the polymer product in N,N-dimethylformamide into a precipitating bath. The fibers so prepared had a tenacity of 3.1 g. per denier, an extensibility of 20 per cent, a sticking temperature of 165° C., and shrank 9 per cent in boiling water. Fibers obtained from a mechanical mixture containing 80 per cent by weight of polyacrylonitrile and 20 per cent by weight of polyvinyl acetate had a tenacity of 3.0 g. per denier, an extensibilty of 18 per cent, a sticking temperature of 145° C., and shrank 8 per cent in boiling water.

Example 6

2.0 g. of methacrylamide were dissolved in 50 cc. of water containing 0.05 g. of ammonium persulfate. The resulting solution was heated at 50° C. for sixteen hours, cooled to room temperature, and a mixture containing 8.0 g. of acrylonitrile, 0.1 g. of ammonium persulfate, and 0.1 g. of sodium bisulfite was added. The reaction mixture was allowed to stand at 25° C. for sixteen hours. The precipitated polymer weighed 9.3 g. and contained 19 per cent by weight of methacrylamide by analysis.

Fibers obtained from this polymer had a tenacity of 3.2 g. per denier, an extensibility of 19 per cent, a sticking temperature of 225° C., and shrank 11 per cent in boiling water.

Example 7

4.0 g. of vinyl acetate were suspended in 40 cc. of water containing 0.04 g. of ammonium persulfate, 0.04 g. of sodium bisulfite, and 2.2 g. of an aryloxy polyalkylene sulfonated ether (Triton 720). The resulting emulsion was allowed to polymerize for sixteen hours at 50° C., then cooled to room temperature and a dispersion containing 6.0 g. of acrylonitrile, 0.1 g. of potassium persulfate, 0.1 g. of sodium bisulfite, and 2.0 g. of an aryloxy polyalkylene sulfonated ether (Triton 720) in 50 cc. of water was added. The reaction mixture was tumbled for two hours at 50° C. There were thus obtained 9.4 g. of polymer product containing 43 per cent by weight of vinyl acetate.

Example 8

1.0 g. of N-methylacrylamide was dissolved in 10 cc. of water containing 0.01 g. of potassium persulfate and 0.01 g. of sodium bisulfite. The solution was heated for 12 hours at 35° C., and 19 g. of acrylonitrile, 0.1 g. of potassium persulfate, and 0.1 g. of sodium bisulfite in 100 cc. of water were added, and the polymerization was continued an additional 8 hours at 35° C. The precipitated polymer product was obtained in a 92 per cent yield and contained 5 per cent by weight of N-methylacrylamide. It was soluble in N,N-dimethylformamide or N,N-dimethylacetamide. Fibers obtained from these solutions had a sticking temperature of 230° C.

Example 9

8.0 g. of vinyl acetate were suspended in 80 cc. of water containing 0.1 g. of ammonium persulfate, 0.1 g. of sodium bisulfite, and 5.0 g. of a aryloxy polyalkylene sulfonated ether (Triton 720). The emulsion was allowed to polymerize for 16 hours at 50° C., at the end of which time polymerization seemed to be complete. The reaction mixture was then cooled and added to a dispersion containing 2.0 g. of acrylonitrile, 0.05 g. of ammonium persulfate, 0.05 g. of sodium bisulfite and 1.0 g. of a aryloxy polyalkylene sulfonated ether (Triton 720) in 30 cc. of water. After tumbling the reaction mixture for 4 hours at 50° C. there were obtained 9.7 g. of polymer containing 83 per cent by weight of vinyl acetate.

Example 10

2.0 g. of citraconamide, 0.05 g. of potassium persulfate and 1 cc. of 7-ethyl-2-methylundecan-4-sulfonic acid sodium salt (Tergitol No. 4) were added to 30 cc. of water. The resulting emulsion was then tumbled at 50° C. for 12 hours, at the end of which time 8.0 g. of acrylonitrile and 0.1 g. of potassium persulfate in 70 cc. of water were added. The reaction mixture was then tumbled for an additional 12 hours at 50° C. The resulting polymer was obtained in an 88 per cent yield and contained 18 per cent by weight of citraconamide by analysis. It was soluble in either N,N-dimethylformamide or N,N-dimethylacetamide.

Fibers obtained by extruding a solution of the polymer obtained in the above example in N,N-dimethylformamide into a precipitating bath had a sticking temperature of 225° C., and showed an excellent affinity for acetate dyes.

Example 11

3.0 g. of itaconamide, 0.1 g. of ammonium persulfate, 0.1 g. of sodium bisulfite, and 1.0 g. of a aryloxy polyalkylene sulfonated ether (Triton 720) were added to 50 cc. of distilled water. The resulting emulsion was then heated for 12 hours at 45° C. with tumbling. A solution of 17.0 g. of acrylonitrile, 0.2 g. of ammonium persulfate and 0.2 g. of sodium bisulfite in 50 cc. of distilled water was then added. The reaction mixture was then heated for an additional 8 hours at 35° C. The resulting polymer was obtained in an 89 per cent yield and contained 14 per cent by weight of itaconamide by analysis.

Fibers obtained by extruding a solution of the polymer obtained in the above example in a solvent, such as N,N-dimethylformamide, into a precipitating bath had a tenacity of 3.9 g. per denier, an extensibility of 21 per cent, a sticking temperature of 225° C., and shrank 7 per cent in boiling water.

Example 12

2.5 g. of methyl methacrylate were suspended in 30 cc. of water containing 0.01 g. of ammonium persulfate, 0.01 g. of sodium bisulfite, and 1.0 g. of a aryloxy polyalkylene sulfonated ether (Triton 720). The resulting emulsion was then tumbled for 8 hours at 50° C., and after cooling to room temperature, an emulsion of 7.5 g. of acrylonitrile, 0.1 g. of ammonium persulfate, 0.1 g. of sodium bisulfite, and 1.0 g. of a aryloxy polyalkylene sulfonated ether (Triton 720) in 70 cc. of water was added. After tumbling the reaction mixture for an additional 12 hours at 40° C. a polymer product was obtained which contained 26 per cent methyl methacrylate by analysis. It was soluble in N,N-dimethylformamide or N,N-dimethylacetamide.

Fibers obtained from this polymer had a sticking temperature of 190° C.

Example 13

2.0 g. of methyl acrylate were suspended in 30 cc. of water containing 0.01 g. of 90 per cent hydrogen peroxide and 1.0 g. of a aryloxy polyalkylene sulfonated ether (Triton 720). The resulting emulsion was tumbled for 12 hours at 50° C., and after cooling to room temperature, 8.0 g. of acrylinitrile, 0.1 g. of a 90 per cent hydrogen peroxide solution, and 1.0 g. of a aryloxy polyalkylene sulfonated ether (Triton 720) in 80 cc. of water were added. After tumbling for an additional 12 hours at 50° C., the polymerization was substantially complete. The resulting polymer contained 19 per cent methyl acrylate by analysis and was soluble in such solvents as N,N - dimethylformamide, N,N - dimethylacetamide, etc.

Example 14

20 g. of vinyl acetate were suspended in 150 cc. of water along with 0.2 g. of ammonium persulfate, 0.2 g. of sodium bisulfite, and 4 cc. of 7-ethyl-2-methylundecan-4-sulfonic acid sodium salt (Tergitol No. 4). The resulting emulsion was then heated for 16 hours at 50° C., and after cooling to room temperature, there were added 1.0 g. of acrylonitrile, 0.02 g. of ammonium persulfate, and 0.02 g. of sodium bisulfite. The reaction mixture was then heated for an additional 12 hours at 35° C. The resulting polymer was obtained in a 93 per cent yield and contained 4.5 per cent acrylonitrile by analysis.

This polymer was soluble in such solvents as N,N - dimethylformamide, N,N - dimethylacetamide, etc., and was compatible with polyacrylonitrile.

Example 15

20 g. of vinyl acetate were suspended in 150 cc. of water along with 0.2 g. of ammonium persulfate, 0.2 g. of sodium bisulfite, and 4 cc. of 7-ethyl-2-methylundecan-4-sulfonic acid sodium salt (Tergitol No. 4). The resulting emulsion was heated for 16 hours at 50° C., and after cooling to room temperature, there were added 10 g. of acrylonitrile, 0.1 g. of ammonium persulfate, and 0.1 g. of sodium bisulfite. The reaction mixture was heated for an additional 12 hours at 35° C. There was thus obtained a polymer in 91 per cent yield which contained 29 per cent acrylonitrile by analysis.

Fibers spun by extruding a solution of a mixture of the polymer contained in the above example and polyacrylonitrile in N,N - dimethylformamide into a precipitating bath contained 20 per cent vinyl acetate, had a tenacity of 2.9 g. per denier, a sticking temperature of 195° C., an extensibility of 15 per cent, and 1.3 per cent moisture absorption at 65 per cent relative humidity. They had an excellent affinity for acetate or vat dyes.

Example 16

10 g. of N-methylacrylamide were dissolved in 50 cc. of water containing 0.1 g. of potassium persulfate and 0.1 g. of sodium bisulfite. The solution was then heated for 12 hours at 35° C., at the end of which time polymerization seemed to be complete. There were then added 2.0 g. of acrylonitrile, 0.01 g. of potassium persulfate and 0.01 g. of sodium bisulfite, and the reaction mixture was heated for an additional 8 hours at 35° C. The polymer was precipitated by the addition of acetone and was obtained in an 86 per cent yield. It contained 16 per cent acrylonitrile by analysis.

Fibers obtained from a mixture of the polymer obtained in the above example and polyacrylonitrile contained 20 per cent N-methylacrylamide and had a tenacity of 3.2 g. per denier, an extensibility of 21 per cent, a sticking temperature of 200° C., and shrank 10 per cent in boiling water. The fibers had an excellent affinity for acetate, direct vat, and acid dyes.

Example 17

2.0 g. of N-methylmethacrylamide were dissolved in 50 cc. of water containing 0.1 g. potassium persulfate. The solution was heated for 12 hours at 50° C., and after cooling to room temperature, there were added 3.0 g. of acrylonitrile, 0.05 g. of potassium persulfate, 0.02 g. of sodium bisulfite. The reaction mixture was then heated an additional 8 hours at 35° C., and after precipitating the polymer product by the addition of acetone, there was obtained a polymer which contained 21 per cent acrylonitrile by analysis.

Fibers obtained by extruding a solution in N,N-dimethylformamide of a mixture of the polymer obtained in the above example and polyacrylonitrile into a precipitating bath contained 20 per cent of N-methylmethacrylamide and had a tenacity of 2.3 g. per denier, an extensibility of 23 per cent, a sticking temperature of 210° C., a moisture absorption of 5 per cent at 65 per cent relative humidity, and shrank 14 per cent in boiling water. They had an excellent affinity for acetate, direct vat, and acid dyes.

Example 18

12 g. of methyl α-acetaminoacrylate were dissolved in 50 cc. of distilled water containing 0.1 g. of ammonium persulfate. The reaction mixture was then heated for 16 hours at 35° C., at the end of which time polymerization appeared to be complete. There were added to the cooled mixture 2.0 g. of acrylonitrile, 0.02 g. of ammonium persulfate, and 0.02 g. of sodium bisulfite. The reaction mixture was then heated for an additional 12 hours at 35° C., and the resulting polymer was coagulated by the addition of acetone. The polymer contained 14 per cent acrylonitrile by analysis.

Fibers obtained from a mixture of the polymer obtained in the above example and polyacrylonitrile contained 30 per cent methyl α-acetaminoacrylate and had a tenacity of 3.5 g. per denier, a sticking temperature of 225° C., 5.3 per cent moisture absorption at 65 per cent relative humidity, and shrank 11 per cent in boiling water. The fibers had excellent affinity for acetate, direct vat, and acid dyes.

Example 19

3.0 g. of methyl α-acetaminoacrylate were dissolved in 30 cc. of water containing 0.01 g. of ammonium persulfate. The resulting solution was heated for 12 hours at 35° C., and after cooling to room temperature, there were added 7.0 g. of acrylonitrile, 0.1 g. of ammonium persulfate, and 0.1 g. of sodium bisulfite. The reaction mixture was then heated for an additional 8 hours at 35° C., and the polymer which resulted was found to contain 31 per cent methyl α-acetaminoacrylate. It was obtained in a 90 per cent yield.

Fibers obtained by extruding a solution in N,N-dimethylformamide of the polymer obtained in the above example into a precipitating bath had a tenacity of 3.9 g. per denier, an extensibility of 21 per cent, a sticking temperature of 230° C., and shrank 8 per cent in boiling water.

Example 20

1.0 g. of N-isopropylmethacrylamide was dissolved in 50 cc. of acetonitrile containing 0.05 g. of benzoyl peroxide. The solution was heated for 16 hours at 65° C., and after cooling to room temperature, there were added 9.0 g. of acrylonitrile and 0.1 g. of benzoyl peroxide. The reaction mixture was then heated for an additional 16 hours at 65° C. The resulting polymer was obtained in an 85 per cent yield and contained 9 per cent N-isopropylmethacrylamide.

Fibers spun by extruding a solution of this polymer into a precipitating bath had a tenacity of 2.5 g. per denier, an extensibility of 18 per cent, a sticking temperature of 200° C., and shrank 7 per cent in boiling water.

Example 21

3.0 g. of methyl α-carbethoxyaminoacrylate were dissolved in 70 cc. of water containing 0.05 g. of potassium persulfate and 0.05 g. of sodium bisulfite. The mixture was then held for 8 hours at room temperature at the end of which time polymerization appeared to be complete. There were then added 7.0 g. of acrylonitrile, 0.1 g. of potassium persulfate, and 0.1 g. of sodium bisulfite, and the reaction mixture was allowed to stand for an additional 8 hours. The polymer was obtained in an 85 per cent yield and contained 32 per cent methyl α-carbethoxyaminoacrylate by analysis.

Fibers obtained from this polymer had a tenacity of 2.9 g. per denier, an extensibility of 20 per cent, a sticking temperature of 210° C., and shrank 8 per cent in boiling water.

Other vinyl esters, in addition to the vinyl acetate used above, can be advantageously employed in our invention. Typical esters include vinyl formate, vinyl propionate, vinyl isobutyrate, vinyl n-butyrate, etc.

Other solvents which can be used for the preparation of fibers from the new polymers of our invention include ethylene carbonate, ethylene carbamate, γ-butyrolactone, N-methyl-2-pyrrolidone, N,N-dimethylmethoxyacetamide, dimethylcyanamide, N,N-dimethylcyanoacetamide, N,N-dimethyl-β-cyanopropionamide, glycolonitrile (formaldehyde cyanohydrin), malononitrile, ethylenecyanohydrin, dimethylsulfoxide, dimethyl sulfone, tetramethylene sulfone, tetramethylene sulfoxide, N-formylpyrrolidine, N-formylmorpholine, N,N'-tetramethylmethanephosphonamide, etc. Generally speaking, we have found that N,N-dimethylformamide and N,N-dimethylacetamide are particularly advantageous. The amount of polymer dissolved in the solvent can vary from about 10 to 40 per cent by weight.

Instead of using an aqueous medium as is disclosed in a number of the above examples, it is possible to use organic solvents, such as the acetonitrile used in Example 20, aromatic hydrocarbons, such as benzene, toluene, etc., liquid alkanes, such as n-heptane, etc., aliphatic ethers, acetone, etc. As noted above, organic solvents which are water soluble can be used along with water in the polymerization. The term dispersion as used herein is intended to include both true solutions and emulsions.

The polymers of our invention can also be used in the preparation of sheets, films, tapes, etc.

What we claim as our invention and desire secured by Letters Patent of the United States is:

1. A process for preparing resinous compositions comprising heating in the presence of a polymerization catalyst a dispersion containing as the sole polymerizable monomer a monomer selected from the group consisting of those represented by the following general formulas:

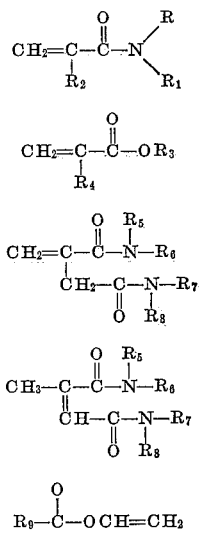

wherein R and $R_1$ each represents a member selected from the group consisting of a hydrogen atom and an alkyl group containing from 1 to 4 carbon atoms, $R_2$ represents a member selected from the group consisting of a hydrogen atom and a methyl group, $R_3$ represents an alkyl group containing from 1 to 4 carbon atoms, $R_4$ represents a member selected from the group consisting of a hydrogen atom, a methyl group, an acylamino group wherein the acyl group is the acyl group of a saturated aliphatic carboxylic acid containing from 2 to 4 carbon atoms, and a carbalkoxylamino group wherein the alkoxyl group contains from 1 to 4 carbon atoms, $R_5$, $R_6$, $R_7$ and $R_8$ each represents a member selected from the group consisting of a hydrogen atom, a methyl group, and an ethyl group, and $R_9$ represents a member selected from the group consisting of a hydrogen atom and an alkyl group containing from 1 to 3 carbon atoms, until the monomer has substantially completely homopolymerized, adding from 60 to 95 per cent by weight of acrylonitrile, based on combined weights of the other monomer and acrylonitrile, to the reaction mixture containing the resulting, unseparated homopolymer, and heating the reaction mixture until the acrylonitrile has substantially completely polymerized.

2. A process for preparing resinous compositions comprising heating in the presence of a peroxide polymerization catalyst an aqueous dispersion containing as the sole polymerizable monomer an acrylamide selected from those represented by the following general formula:

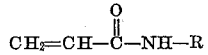

wherein R represents an alkyl group containing from 1 to 4 carbon atoms, until the monomer has substantially completely homopolymerized, adding from 60 to 95 per cent by weight of acrylonitrile, based on the combined weights of the acrylamide and acrylonitrile, to the reaction mixture containing the resulting, unseparated homopolymer, and heating the reaction mixture until the acrylonitrile has substantially completely polymerized.

3. A process for preparing resinous compositions comprising heating in the presence of a peroxide polymerization catalyst an aqueous dispersion containing as the sole polymerizable monomer a methacrylamide selected from those represented by the following general formula:

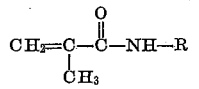

wherein $R_9$ represents an alkyl group containing from 1 to 4 carbon atoms, until the monomer has substantially completely homopolymerized, adding from 60 to 95 per cent by weight of acrylonitrile, based on the combined weights of the methacrylamide and acrylonitrile, to the reaction mixture containing the resulting, unseparated homopolymer, and heating the reaction mixture until the acrylonitrile has substantially completely polymerized.

4. A process for preparing resinous compositions comprising heating in the presence of a peroxide polymerization catalyst an aqueous dispersion containing as the sole polymerizable monomer a vinyl ester selected from those represented by the following general formula:

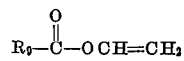

wherein $R_9$ represents an alkyl group containing from 1 to 3 carbon atoms, until the monomer has substantially completely homopolymerized, adding from 60 to 95 per cent by weight of acrylonitrile, based on the combined weights of vinyl ester and acrylonitrile, to the reaction mixture containing the resulting, unseparated homopolymer, and heating the reaction mixture until the acrylonitrile has substantially completely polymerized.

5. A process for preparing resinous compositions comprising heating in the presence of a peroxide polymerization catalyst an aqueous dispersion containing N-methylacrylamide as the sole polymerizable monomer until homopolymerization is substantially complete, adding from 60 to 95 per cent by weight of acrylonitrile, based on the combined weights of N-methylacrylamide and acrylonitrile, to the reaction mixture containing the resulting, unseparated homopolymer, and heating the reaction mixture until the acrylonitrile has substantially completely polymerized.

6. A process for preparing resinous compositions comprising heating in the presence of a peroxide polymerization catalyst an aqueous dispersion containing N-isopropylmethacrylamide as the sole polymerizable monomer until homopolymerization is substantially complete, adding from 60 to 95 per cent by weight of acrylonitrile, based on the combined weights of N-isopropylmethacrylamide and acrylonitrile, to the reaction mixture containing the resulting, unseparated homopolymer, and heating the reaction mixture until the acrylonitrile has substantially completely polymerized.

7. A process for preparing resinous compositions comprising heating in the presence of a peroxide polymerization catalyst an aqueous dispersion containing N,N-dimethyacrylamide as the sole polymerizable monomer until homopolymerization is substantially complete, adding from 60 to 95 per cent by weight of acrylonitrile, based on the combined weights of N,N-dimethylacrylamide and acrylonitrile, to the reaction mixture containing the resulting, unseparated homopolymer, and heating the reaction mixture until the acrylonitrile has substantially completely polymerized.

8. A process for preparing resinous compositions comprising heating in the presence of a peroxide polymerization catalyst an aqueous dispersion containing methacrylamide as the sole polymerizable monomer until homopolymerization is substantially complete, adding from 60 to 95 per cent by weight of acrylonitrile, based on the combined weights of methacrylamide and acrylonitrile, to the reaction mixture containing the resulting, unseparated homopolymer, and heating the reaction mixture until the acrylonitrile has substantially completely polymerized.

9. A process for preparing resinous compositions comprising heating in the presence of a peroxide polymerization catalyst an aqueous dispersion containing vinyl acetate as the sole polymerizable monomer until homopolymerization is substantially complete, adding from 60 to 95 per cent by weight of acrylonitrile, based on the combined weights of vinyl acetate and acrylonitrile, to the reaction mixture containing the resulting, unseparated homopolymer, and heating the reaction mixture until the acrylonitrile has substantially completely polymerized.

10. The products obtained by the process of claim 1.

11. The products obtained by the process of claim 2.

12. The process obtained by the process of claim 3.

13. The products obtained by the process of claim 4.

14. The products obtained by the process of claim 5.

15. The products obtained by the process of claim 6.

16. The products obtained by the process of claim 7.

17. The products obtained by the process of claim 8.

18. The products obtained by the process of claim 9.

HARRY W. COOVER, Jr.
JOSEPH B. DICKEY.

References Cited in the file of this patent

UNITED STATES PATENTS

| Number | Name | Date |
|---|---|---|
| 1,710,825 | Herrmann et al. | Apr. 30, 1929 |
| 2,123,599 | Fikentscher et al. | July 12, 1938 |
| 2,388,685 | Guss et al. | Nov. 13, 1945 |
| 2,476,474 | Baer | July 19, 1946 |
| 2,511,811 | Baer | June 13, 1950 |
| 2,520,959 | Powers | Sept. 5, 1950 |
| 2,538,779 | Harrison et al. | Jan. 23, 1951 |